US011538261B2

(12) United States Patent
Behrooz et al.

(10) Patent No.: US 11,538,261 B2
(45) Date of Patent: Dec. 27, 2022

(54) SYSTEMS AND METHODS FOR AUTOMATED CELL SEGMENTATION AND LABELING IN IMMUNOFLUORESCENCE MICROSCOPY

(71) Applicant: Verily Life Sciences LLC, South San Francisco, CA (US)

(72) Inventors: Ali Behrooz, San Francisco, CA (US); Charles Santori, Palo Alto, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 0 days.

(21) Appl. No.: 16/711,917

(22) Filed: Dec. 12, 2019

(65) Prior Publication Data

US 2020/0193139 A1   Jun. 18, 2020

Related U.S. Application Data

(60) Provisional application No. 62/779,001, filed on Dec. 13, 2018.

(51) Int. Cl.
*G06K 9/00* (2022.01)
*G06V 20/69* (2022.01)
(Continued)

(52) U.S. Cl.
CPC ............ *G06V 20/69* (2022.01); *G06T 5/30* (2013.01); *G06T 7/11* (2017.01); *G06T 7/12* (2017.01);
(Continued)

(58) Field of Classification Search
CPC .. G01N 15/1475; G01N 21/17; G01N 33/533; G01N 2021/174; G06K 9/00127;
(Continued)

(56) References Cited

U.S. PATENT DOCUMENTS

2002/0154798 A1* 10/2002 Cong ................. G01N 15/14
382/199
2005/0267690 A1* 12/2005 Cong ................. G01N 15/14
382/128

(Continued)

FOREIGN PATENT DOCUMENTS

WO    02067195    8/2002

OTHER PUBLICATIONS

Steyer, Grant J., et al. "Cryo-imaging of fluorescently labeled single cells in a mouse." Medical Imaging 2009: Biomedical Applications in Molecular, Structural, and Functional Imaging. vol. 7262. International Society for Optics and Photonics, 2009. (Year: 2009).*

(Continued)

*Primary Examiner* — Avinash Yentrapati
(74) *Attorney, Agent, or Firm* — Kilpatrick Townsend & Stockton LLP

(57) ABSTRACT

Various techniques are provided for performing automated full-cell segmentation and labeling in immunofluorescent microscopy. These techniques perform membrane segmentation and nuclear seed detection separate and independently from each other, then combine their results to identify cell boundaries. Some embodiments use texture- and kernel-based image processing to perform the method. In some embodiments, the method for obtaining membrane features disclosed herein can be used in conjunction with or separate from the nuclear features. The results can be used for a variety of purposes, including whole-area cell segmentation in fluorescence-based tissue imaging.

21 Claims, 8 Drawing Sheets
(4 of 8 Drawing Sheet(s) Filed in Color)

(51) Int. Cl.
*G06T 7/12* (2017.01)
*G06T 7/155* (2017.01)
*G06T 5/30* (2006.01)
*G06T 7/11* (2017.01)

(52) U.S. Cl.
CPC .... *G06T 7/155* (2017.01); *G06T 2207/10056* (2013.01); *G06T 2207/10064* (2013.01); *G06T 2207/20152* (2013.01); *G06T 2207/30024* (2013.01)

(58) Field of Classification Search
CPC ............ G06K 9/00134; G06K 9/0014; G06K 9/00147; G06T 7/521; G06T 2207/30024; G06T 7/12; G06T 7/155; G06T 5/30; G06T 2207/10056; G06T 2207/10064; G06T 2207/20152
See application file for complete search history.

(56) References Cited

U.S. PATENT DOCUMENTS

| | | | |
|---|---|---|---|
| 2009/0081775 A1* | 3/2009 | Hodneland | A61P 25/18 435/317.1 |
| 2010/0172556 A1* | 7/2010 | Cohen | A61B 18/1492 600/407 |
| 2011/0274337 A1 | 11/2011 | Hunter et al. | |
| 2013/0108139 A1 | 5/2013 | Binnig et al. | |
| 2017/0103521 A1* | 4/2017 | Chukka | G06T 7/0012 |
| 2019/0147215 A1* | 5/2019 | Al-Kofahi | G06T 7/194 382/133 |

OTHER PUBLICATIONS

Ortiz De Solorzano et al., "Segmentation of nuclei and cells using membrane related protein markers", Journal of Microscopy, retrieved via internet at https://doi.org/10.1046/j.1365-2818.2001.00854.x, Dec. 21, 2001, pp. 404-415.

Al-Kofahi et al., "A Deep Learning-Based Algorithm For 2-D Cell Segmentation in Microscopy Images", BMC Bioinformatics, vol. 19, Article No. 365, 2018, 11 pages.

PCT/US2019/065903, "International Search Report and Written Opinion", dated Feb. 25, 2020, 11 pages.

Xing et al., "An Automatic Learning-Based Framework for Robust Nucleus Segmentation", IEEE Transactions on Medical Imaging, vol. 35, No. 2, Feb. 2016, pp. 550-566.

* cited by examiner

SYSTEMS AND METHODS FOR AUTOMATED CELL SEGMENTATION AND LABELING IN IMMUNOFLUORESCENCE MICROSCOPY

CROSS-REFERENCE OF RELATED APPLICATIONS

This application claims the benefit of and the priority to U.S. Provisional Application No. 62/779,001, filed on Dec. 13, 2018, which is hereby incorporated by reference in its entirety for all purposes.

BACKGROUND

Recently, tissue microscopy and cell imaging using microscopy have been developing rapidly, and the use of these techniques is becoming increasingly widespread. Tissue images have been used to perform disease-related research studies and clinical diagnoses. Cell segmentation and labeling have been used in tissue imaging assays for a variety of purposes. For example, cell segmentation may be used to detect, quantify and/or classify tissue biomarkers. The biomarker information can then be used to characterize and/or label a tissue, which can inform a diagnosis and/or progression assessment.

Various techniques have been proposed for performing cell segmentation. Many approaches rely on staining the biopsied tissue using a nuclear stain prior to imaging. Segmentation is then performed to detect portions of the image corresponding to individual cells based on the stained regions representing locations of nuclei. This process may be referred to as nuclear segmentation. However, nuclear segmentation alone cannot render full cell segmentation, i.e., labeling individual cells distinctly and in their entireties extending to the cell boundaries or membranes. This is due to the fact that nuclear segmentation only localizes and distinguishes cell nuclei.

Some techniques for performing nuclear segmentation in tissue microscopy rely on a combination of morphological, analytical, and feature-based image processing operations that localize, separate, and label nuclei belonging to different types of cells. While this can be sufficient for pinpointing representative or seed labels for different cells, it still is insufficient for detecting non-nucleus portions of the cell and/or boundaries of a cell. That is, nuclear segmentation is insufficient for and distinct from whole-area cell segmentation. Whole-area cell segmentation is a process by which individual cells may be identified up to their boundaries or membranes.

Thus, other approaches for whole-area cell segmentation have been proposed. The sample may be stained using a fluorescent stain that is absorbed by the cell membranes. Segmentation may then be performed to detect portions of the image corresponding to the cell membranes based on the stain. Thus, individual cells may be labeled to their membranes. However, these approaches are currently limited to fluorescent images from cell culture assays (e.g., population of cells cultured in labs) and do not involve fluorescence tissue microscopy (i.e., slices of fixed biological tissue extracted from animals or humans and stained with fluorescent labels). Techniques developed for segmentation in cell culture assays do not directly translate to and solve the whole-area cell segmentation problem in tissue assays. This is because in cell culture experiments, there is higher control due to lower complexity and higher regularity, over uniformity of cells in the cell culture fluorescence images as compared to tissue fluorescence images. In addition, existing approaches for whole-area cell segmentation rely on iterative and computationally intensive operations. For example, some approaches use contour-finding techniques to identify cell boundaries. These approaches suffer from slow convergence and are computationally expensive.

Other techniques label the cellular surface by identifying a seed for each cell using staining and expanding the boundary until the limits of the cell are reached. The boundary may be identified based on differences in color or shade. However, when applying the technique to tissue specimens, these techniques use manually selected or interactively defined seeds sourced from a user's indications (e.g., clicks of a computer mouse) that identify the cell nuclei. Manual selection may be required because many nucleus and membrane markers in tissue specimens can form complex shapes and have irregular spatial distributions. Thus, these techniques require manual interaction from the user.

SUMMARY

Thus, it would be advantageous to develop a fully automated whole-cell segmentation method for tissue specimens.

In some embodiments, a computer-implemented method is provided. A membrane stain is applied to a tissue sample, such that a plurality of cells are stained (thereby producing a membrane-stained sample). A first fluorescence image is obtained of at least a portion of the membrane-stained sample. The first fluorescence image is inverted and converted into binary, thereby generating an inverted binary image. Cell boundaries of the plurality of cells are detected in the inverted binary image, and a membrane-segmented label image is generated to include the cell boundaries. The tissue sample is stained (e.g., after being washed and/or before the membrane stain is applied) with a nuclear stain such that nuclei of the plurality of cells are stained (thereby producing a nuclear-stained sample). A second fluorescence image is obtained of at least a portion of the nuclear-stained sample. Nuclear seed detection is performed on the second fluorescence image by locating nuclei of the plurality of cells by detecting locations at which the nuclear stain appeared. The plurality of cells are segmented in at least one of the first or second fluorescence image based on the membrane-segmented label image and the nuclear seed detection. The plurality of cells are labeled in at least one of the first or second fluorescence image to generate a labeled fluorescence image. The labeled fluorescence image is displayed. In some embodiments, the membrane stain and the nuclear stain are two different colors to allow for their differentiation despite two stains being used.

In some embodiments, a computer-program product is provided that is tangibly embodied in a non-transitory machine-readable storage medium. The computer-program product includes instructions configured to cause one or more data processors to perform part or all of one or more methods disclosed herein.

In some embodiments, a system is provided that includes one or more data processors a non-transitory computer readable storage medium. The non-transitory computer readable storage medium contains instructions which, when executed on the one or more data processors, cause the one or more data processors to perform part or all of one or more methods disclosed herein.

BRIEF DESCRIPTION OF THE DRAWINGS

Illustrative embodiments of the present invention are described in detail below with reference to the following drawing figures. The patent or application file contains at least one drawing executed in color. Copies of this patent or patent application publication with color drawing(s) will be provided by the Office upon request and payment of the necessary fee.

DESCRIPTION

Various techniques are provided for performing automated full-cell segmentation and labeling in immunofluorescent microscopy. In some embodiments, these techniques perform membrane segmentation and nuclear seed detection separately and independently from each other, then apply algorithms to the results to identify cell boundaries. Texture- and kernel-based image processing can be used. In some embodiments, the method for obtaining membrane features disclosed herein can be used in conjunction with or separate from the nuclear features. In some embodiments, membrane features can be use to identify whole-area cell segmentation (e.g., without relying on processing of images of samples stained with nuclear stains). The results can be used for a variety of purposes, including whole-area cell segmentation in fluorescence-based tissue imaging. Other applications include texture features for quantification, classification, and grouping of tissue biomarkers in digital pathology platforms including hematoxylin and eosin stains (H&E), scoring and cell counting in H&E, and whole-area non-cell object segmentation (e.g., fatty deposits) in digital microscopy images.

Some embodiments use a computer-implemented algorithm that performs automated computer-based segmentation and labeling of individual cells in digital fluorescence tissue microscopy. The algorithm may perform automated segmentation or separation of individual cells in immunofluorescence microscopy images of tissue samples labeled with nuclear and membrane fluorescent stains.

Figure 1:
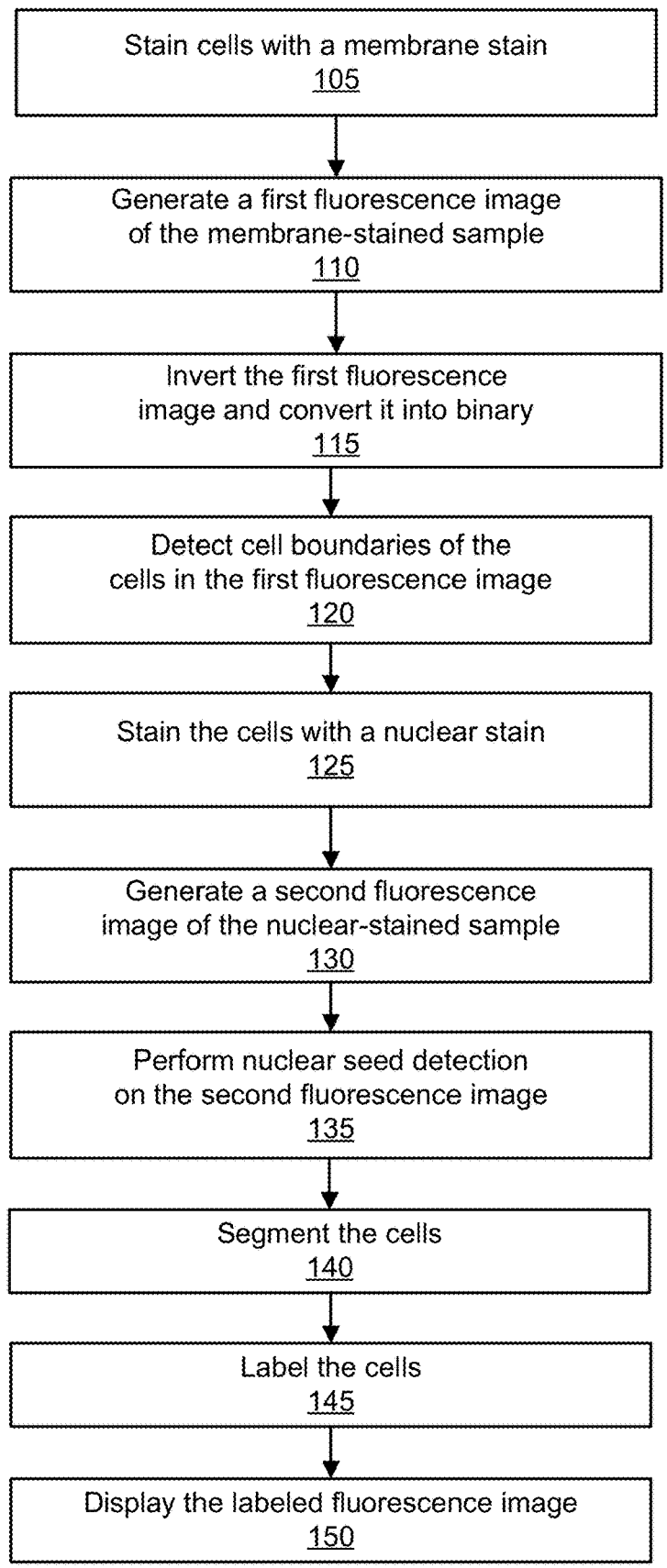
FIG. 1 shows a flowchart illustrating a method for automated cell segmentation and labeling, in accordance with some embodiments.

FIG. 1 is a flowchart illustrating a method for automated cell segmentation and labeling according to some embodiments. At block 105, a plurality of cells may be stained with a membrane stain to generate a membrane-stained sample. Any suitable membrane stain may be used, such as, for example, Na/K ATPase, etc.

At block 110, a first fluorescence image may be generated or obtained of at least a portion of the membrane-stained sample. The first fluorescence image may be an image of a sample (e.g., a tissue sample collected via a biopsy) having been stained with membrane stain. The image may have been collected using fluorescence microscopy and may depict the plurality of cells. The fluorescence image may be an immunofluorescence image. Immunofluorescence may be a technique in which specific antibodies chemically conjugated to fluorescent dyes bind to cellular antigens to allow for visualization of cell structures.

At block 115, the fluorescence image may be inverted and converted into binary, thereby generating an inverted binary image. In other words, the colors present in the fluorescence image may be converted to the opposite color. Once inversion is complete, the fluorescence image may be converted into grayscale. In some embodiments, inversion may not be required.

At block 120, the cell boundaries of the plurality of cells in the inverted binary image may be detected, thereby generating a membrane-segmented label image. Cell boundaries may be identified using (for example) a skeletonization technique, filtering technique and/or edge-detection technique.

At block 125, the plurality of cells may be stained with a nuclear stain to generate a nuclear-stained sample. Any suitable nuclear stain may be applied. For example, Hoescht, DAPI or PoPro-1 staining may be used. In some embodiments, the nuclear stain may be applied in addition to the membrane stain on the plurality of cells. In some embodiments, the nuclear stain may be a different color or spectrum than the membrane stain to allow for differentiation between cell boundaries detected by the membrane stain and cell nuclei detected with the nuclear stain. In some embodiments, the membrane-stained sample may be washed or otherwise cleaned of the membrane stain prior to applying the nuclear stain to the plurality of cells. In such embodiments, it is contemplated that the membrane stain and the nuclear stain may be the same or different colors.

At block 130, a second fluorescence image of the nuclear-stained sample may be obtained or generated. The image may have been collected using fluorescence microscopy and may depict the plurality of cells. The fluorescence image may be an immunofluorescence image.

At block 135, nuclear seed detection may be performed by locating nuclei of the plurality of cells using the second fluorescence image. Nuclei may be detected by using (for example) a filtering technique and/or peak-detection technique. In some instances, nuclear seed detection can be performed by applying a machine-learning technique. For example, the second fluorescence image (or a processed version thereof) may be input into a trained convolutional neural network or a random-forest technique to identify nuclear seeds. Nuclear seed detection can include identifying, for each cell, a particular location within the second fluorescence image and an identifier of a given cell. For example, for a given nuclear stained image, a set of peaks can be identified, which may be inferred to correspond to a set of nuclei. For each nucleus, a location can be identified, which can be defined as a centroid, a weighted center, or mean location of the peak. Thus, for each nuclear stained image, a set of nuclear seed data points can be generated, which include pair-wise combinations of nucleus identifiers and coordinates.

At block 140, the plurality of cells may be segmented in at least one of the first fluorescence image or the second fluorescence based on the membrane-segmented label image and the nuclear seed detection, as described further herein. Notably, the cells are identified using both membrane stains and nuclear stains to attempt to identify cells in a fluorescence image. In some embodiments, the plurality of cells may be segmented based on the first fluorescence image being overlaid onto the second fluorescence image, or vice versa.

At block 145, the plurality of cells may be labeled (i.e., identified) in at least one of the first fluorescence image or the second fluorescence image to generate a labeled fluorescence image. Cells may be labeled (for example) by detecting co-occurrence of labels, performing masked watershed segmentation and/or identifying correct or under-segmented labels. At block 150, the labeled fluorescence image may be displayed. The labeled image can indicate (for example), for each of a set of cells, each pixel predicted to correspond to the cell. The labeled image and/or corresponding data may further or alternatively be stored and/or transmitted to another device. The labeled image may further be processed to generate statistics, such as one or more statistics characterizing shapes, perimeters and/or areas of the cells. The statistics can be presented, stored and/or transmitted.

As indicated, in some instances, multiple images are collected for a single sample. A first image can correspond to a depiction of at least part of the sample after a membrane stain was applied to the sample. A second image can correspond to a depiction of at least part of the sample after a nuclear stain was applied to the sample. The first and second images can be processed to generate an output that identifies, for each of some or all pixels in each of one or both of the first and second images, a label for the pixel that identifies whether the pixel corresponds to a cell and, if so, an identifier of the cell. In some instances, an area of a given cell may be defined to correspond to the combination of pixels having been assigned a label corresponding to the cell.

Processing the first membrane-stained image can include performing identifying portions of the first membrane-stained image that are inferred to correspond to cell membranes. For example, the first membrane-stained image may be processed by filtering, smoothing and/or thresholding the image. Filtering may include applying a color filter, with the color filter defined to correspond to a color associated with the membrane stain. Filtering may additionally including applying a high-pass or low-pass spatial filter. Filtered pixel values may then be compared to a predefined threshold. Edges may be detected before or after the thresholding. In some instances, gaps in individual edges may be joined. As another example, the first membrane-stained image may be processed by applying a skeletonization technique, which may be applied directly to the first membrane-stained image or to a filtered, smoothed and/or thresholded version thereof.

It will be appreciated that various alternative embodiments are contemplated. For example, in some instances, blocks 125-135 of the method depicted in FIG. 1 may be omitted. Cells may be omitted based only or entirely based on the cell boundaries and/or without reliance on an image depicting nuclear staining. For example, such segmentation may be performed by assessing a distance metric for a pixel relative to one or more boundaries (e.g., to identify a label of a cell boundary to which a given pixel is closest).

Figure 2:
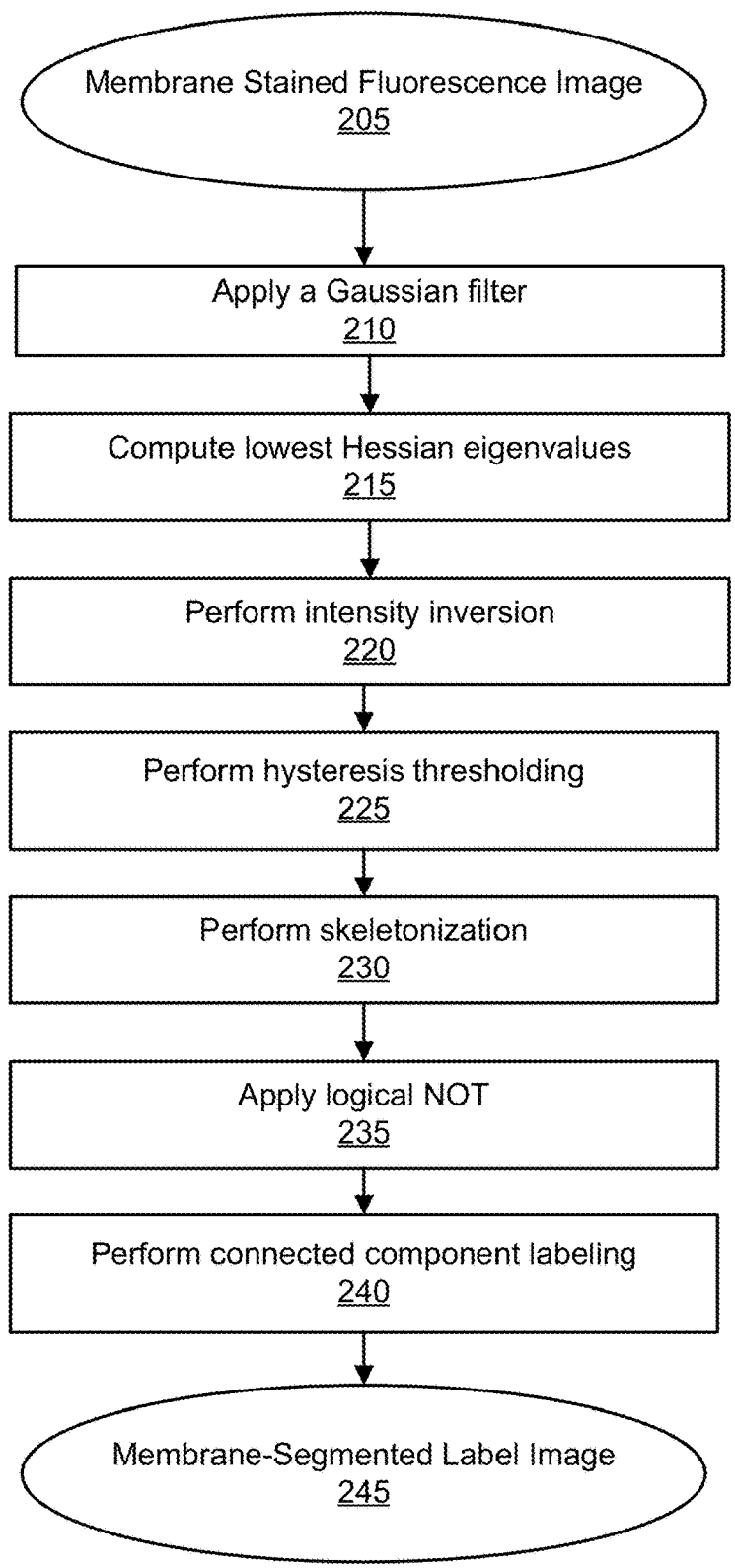
FIG. 2 shows a flowchart illustrating a method for generating a membrane-segmented label image, in accordance with some embodiments.

FIG. 2 illustrates one technique for processing the first membrane-stained image by performing membrane segmentation in accordance with some embodiments. A membrane stained fluorescence image 205 is used as input. The fluorescence image may be an immunofluorescence image. Any suitable membrane stain may be used. The membrane stained fluorescence image 605 may be inverted and converted to grayscale in some embodiments.

At block 210, a Gaussian filter may be applied to the membrane stained fluorescence image 205. The Gaussian filter may be applied to blur the membrane stained fluorescence image 205 in order to remove noise and spatial detail. The Gaussian filter may be implemented using a low pass filter.

At block 215, the lowest eigenvalue of the Hessian matrix may be computed at each pixel. As understood by one skilled in the art, a Hessian matrix may be a square matrix of second-order partial derivatives of a scalar field. The eigenvalues give information about the Hessian matrix. For example, Hessian eigenvalues may include geometric information about a surface. It will be appreciated that other techniques may be used alternative to or in addition to the computation of the lowest eigenvalue of the Hessian matrix. For example, other forms of second-order spatial derivatives may be used, such as highest Hessian eigenvalues, Laplacian, or any combination of the Hessian matrix entries.

At block 220, intensity inversion may be performed. To perform intensity inversion, the new pixel intensity value is set as the maximum intensity value minus the original pixel intensity value. In some instances, an intensity scaling (e.g., a linear or non-linear scaling) may also be applied.

At block 225, hysteresis thresholding is performed. Hysteresis thresholding may provide edge detection. Hysteresis thresholding has the ability to detect both strong edges and weak edges (i.e., those having less intensity due to noise). In some embodiments, other forms of edge detection may be used instead of hysteresis thresholding. For example, adaptive thresholding or other forms of non-global thresholding may be used.

At block 230, skeletonization may be performed. Skeletonization may reduce foreground regions of an image to a remnant that preserves the connectivity of the original image, while discarding most of the original foreground pixels. In some embodiments, other processes may be performed as an alternative to skeletonization. For example, other morphological thinning or erosion operations may be performed instead of or in addition to skeletonization.

At block 235, a logical NOT is applied. The logical not may be applied to a binary mask such that values of "1" are inverted to "0", and values of "0" are inverted to "1".

At block 240, connected component labeling is performed. Connected component labeling may label connected components (i.e., groups of pixels) in a binary image based on graph theory. Each group of connected components may be uniquely labeled, i.e., each group of connected components may have a separate and distinct label to differentiate it from other groups of connected components. In some embodiments, connected component labeling may be performed one component at a time, such that once the first pixel of a connected component is found, all of the connected pixels of that component are labeled before moving on to the next pixel. In some embodiments, in the context of a binary mask, two "high" pixels may be connected if they are nearest neighbors. Thus, a region may be grown starting from one pixel until there are no more "high" pixels that are nearest neighbors to any of the pixels already in the region. As for which pixels are nearest neighbors, this may include up/down and right/left nearest neighbors only, or it may also include diagonal nearest neighbors.

In some embodiments, connected component labeling may be performed using a two-pass algorithm in which two passes are made: first, to assign temporary labels and record equivalences, and second, to replace the temporary labels with the smallest label of its equivalence class. This involves performing connectivity checks to determine the label to assign to the current pixel. This labeling results in a membrane-segmented label image 645. The membrane-segmented label image 645 may be, for example, similar to that shown and described with respect to FIG. 2.

After skeletonization, it is possible that some membrane features may not be fully closed, leaving dangling branches. After connected component labeling, this may result in some cells being merged. Some of these cases may be corrected by extending the dangling branches to where they should intersect with a nearby membrane feature. For example, all dangling branches may be found. For each dangling branch, the shortest distance to an "opposing" point with high pixel value may be calculated. An "opposing" point means that there is no curved path through connected "high" pixels that is shorter than some length limit, e.g., 10 microns. If this shortest distance to an opposing point is less than a second limit (e.g., 5 microns), then the branch may be extended to this nearest point.

Figure 3:
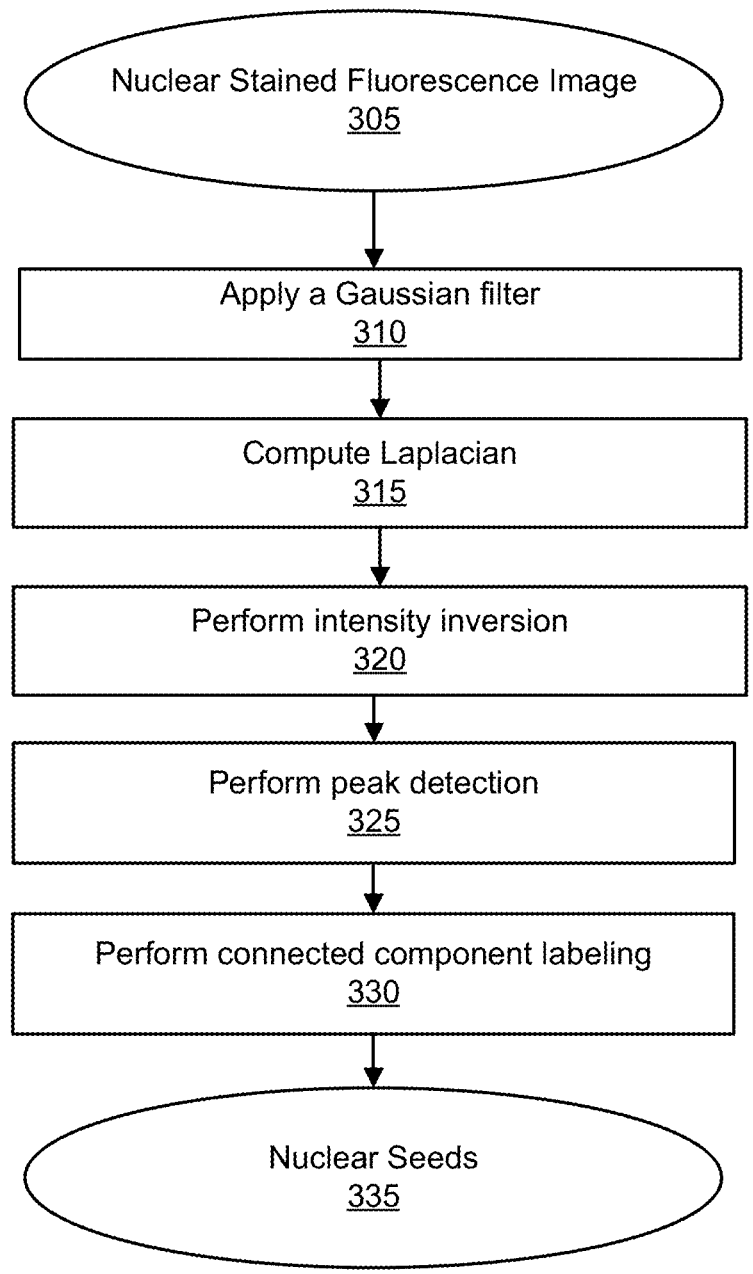
FIG. 3 shows a flowchart illustrating a method for performing nuclear seed detection, in accordance with some embodiments.

FIG. 3 illustrates one technique for processing the second nuclear-stained image by performing nuclear seed detection in accordance with some embodiments. A nuclear stained fluorescence image 305 may be used as input. The fluorescence image may be an immunofluorescence image. Any suitable nuclear stain may be implemented, such as H&E stain. The nuclear stained fluorescence image 305 may be inverted and converted to grayscale in some embodiments.

At block 310, a Gaussian filter may be applied to the nuclear stained fluorescence image 305. The Gaussian filter may be applied to blur the nuclear stained fluorescence image 305 in order to remove noise and detail. The Gaussian filter may be implemented using a low pass filter. In some embodiments, other methods may be applied in lieu of or in addition to a Gaussian filter. For example, other forms of second-order spatial derivatives of the Gaussian filter may include computing highest Hessian eigenvalues.

At block 315, the Laplacian may be computed as a seed generator. As understood by one skilled in the art, Laplacian may also be referred to as a Laplace operator. Laplacian may be a differential operator described by the divergence of the gradient of a function in Euclidean space. The Laplacian of an image may highlight regions of rapid intensity change. Thus, the Laplacian is useful for edge detection. The Laplacian is often applied in conjunction with a Gaussian filter. In some embodiments, the difference of Gaussians may be directly computed with different kernel standard deviation alternatively or additionally with computing the Laplacian.

At block 320, intensity inversion may be performed. Intensity scaling (e.g., linear or non-linear scaling) may additionally be performed.

At block 325, peak detection may be performed. Peak detection may provide an algorithm to determine the highest values in a series of values. For example, the algorithm may identify a peak if that position has a relatively large value in an overall context. One exemplary peak detection method may detect pixels (or adjacent groups of pixels) having intensities or inverted intensities that are above a predefined threshold. For example, a peak may be detected where there is a higher gray level in an image than the surrounding area.

At block 330, connected component labeling may be performed. Connected component labeling may be performed similar to that described with respect to FIG. 2. The output of connected component labeling may be nuclear seeds 335. Nuclear seeds may be markers in the form of single pixels or small regions within the nuclei that qualify and distinguish nuclei of individual cells.

Figure 4:
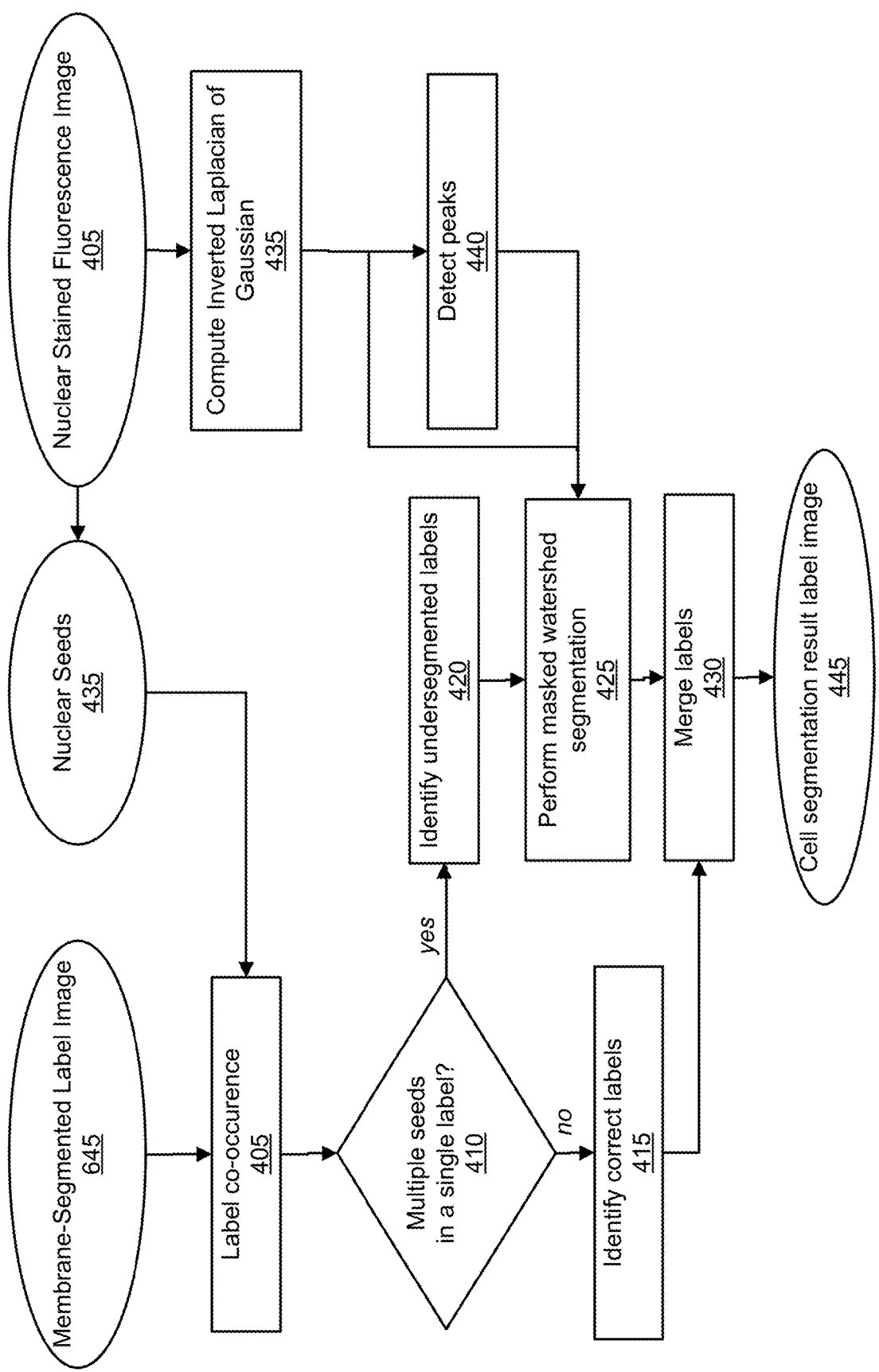
FIG. 4 shows a flowchart illustrating a method for combining membrane segmentation and nuclear seed detection to generate a whole-area cell segmentation result label image, in accordance with some embodiments.

FIG. 4 shows a flowchart illustrating a method for combining membrane segmentation and nuclear seed detection to generate a cell segmentation result label image, in accordance with some embodiments. A membrane-segmented label image, a nuclear-stained fluorescence image and nuclear seeds are accessed. At block 405, the co-occurrences between the two images are labeled. For example, the membrane-segmented label image may be overlaid with the nuclear seeds. At block 410, it is determined whether there are multiple seeds in a single label. Such a finding may indicate that the labeling was incorrect, because each cell membrane should only include one nucleus. If there are not multiple seeds in a single label, the labels are identified as correct at block 415. In other words, each identified cell membrane only has one identified nucleus.

If there are multiple seeds in a single label, they are identified as under-segmented labels at block 420. This may be because multiple nuclei have been identified in a single identified cell membrane, which indicates incorrect labeling because there should only be one nucleus per cell boundary. Thus, these labels may need to be corrected to properly identify the nuclei and/or cell boundaries. In some embodiments, conditions on the size (e.g., a cell boundary that is much larger than the surrounding cell boundaries), eccentricity (e.g., a cell boundary that is shaped much differently than the surrounding cell boundaries), concavity, and other morphometric descriptors of the membrane-segmented labels may be used to identify incorrect labels.

Meanwhile, the nuclear stained fluorescence image is used to compute the inverted Laplacian of Gaussian of the nuclear stained fluorescence image, as described further with respect to FIG. 3. In some embodiments, alternatives may be used alternatively or additionally, such as other second-derivative operators including highest Hessian eigenvalues or by directly computing the difference of Gaussians in nuclear stained fluorescence image 305.

At block 440, peaks in the image are detected. These peaks are used, along with the unsegmented labels, at block 425 to perform masked watershed segmentation. Masked watershed segmentation may be a marker-controlled watershed algorithm that considers an input image as a topographic surface and simulates its flooding from specific seeds. This may split under-segmented regions resulting from membrane segmentation. In some embodiments, alternate seeds and intensity images may be used in the watershed segmentation, including inverted raw nuclear channel images and its peaks. This may result in labels being adjusted, new labels being created, or labels being removed to more accurately identify cell boundaries.

At block 430, the labels may be merged. The corrected labels may be merged with previously segmented labels to generate a whole-area cell segmentation map. In other words, the corrected labels are added to the originally correct labels to output a cell segmentation result label image. If there are no incorrect labels, then the originally correct labels alone may be used to output the cell segmentation result label image.

In some instances, blocks 405-415, blocks 420-430, and blocks 435-430 may be executed concurrently and/or in parallel. In some instances, these groupings of blocks can be executed sequentially (e.g., which can facilitate using a result from execution of one set of blocks as an input to another set of blocks, such as inputting detected features into a segmentation model).

Example

A membrane stain was applied to a sample, and a fluorescent image was collected. The sample was washed, and a nuclear stain was applied to the same. A fluorescent image was collected. The images were processed in accordance with the method depicted in FIG. 1.

Figure 5:
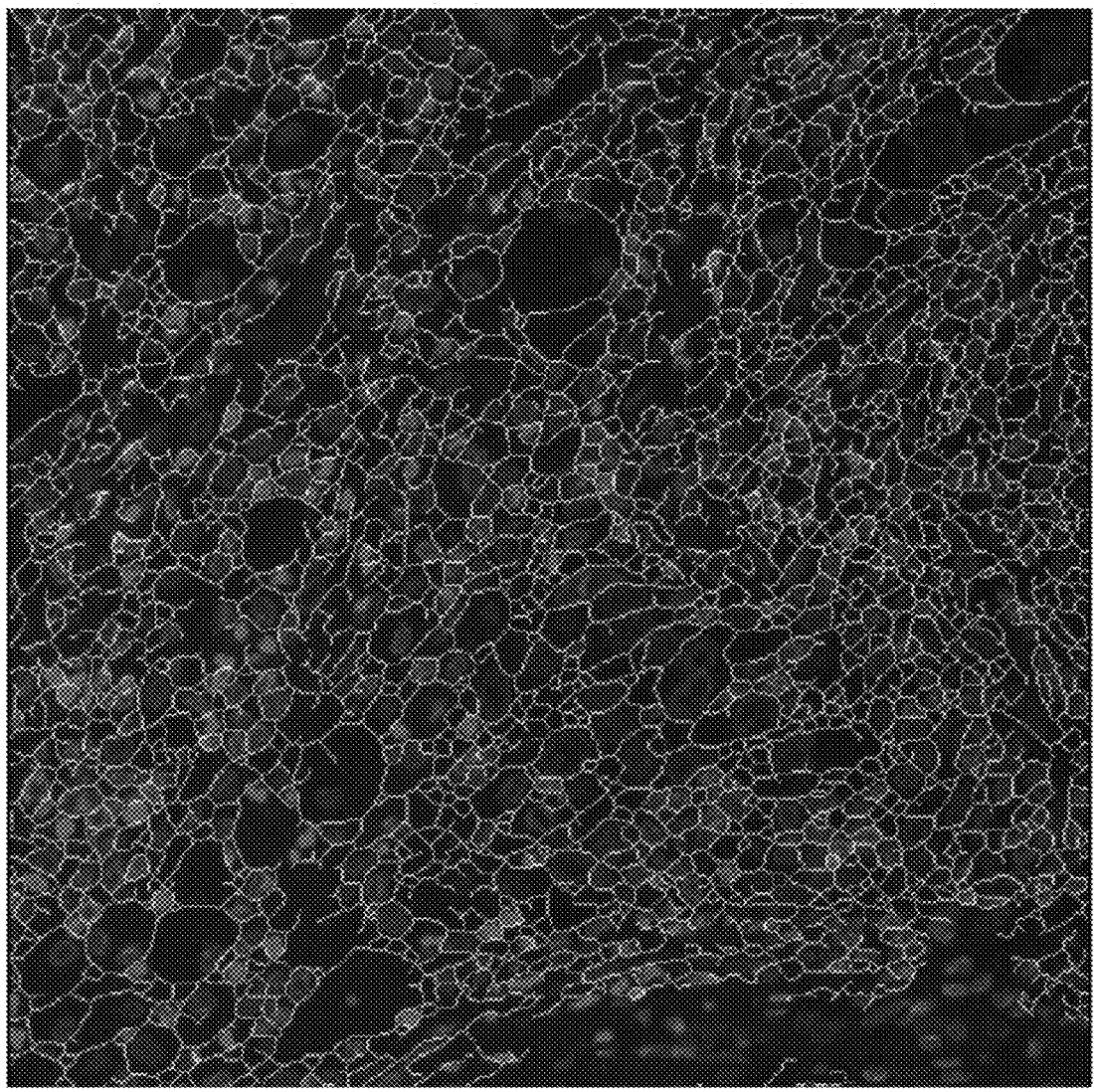
FIG. 5 illustrates the result of membrane segmentation overlaid with the nuclear stain channel, in accordance with some embodiments.

Specifically, the image of the membrane-stained sample was processed using a skeletonization-based technique performed in accordance with the method depicted in FIG. 2. The processing produced a membrane-segmented label image. FIG. 5 illustrates the result of membrane segmentation overlaid with the nuclear stain channel. The white lines represent the binarized mask for cell boundaries, which is the output (before connected component analysis) of membrane segmentation.

Figure 6:
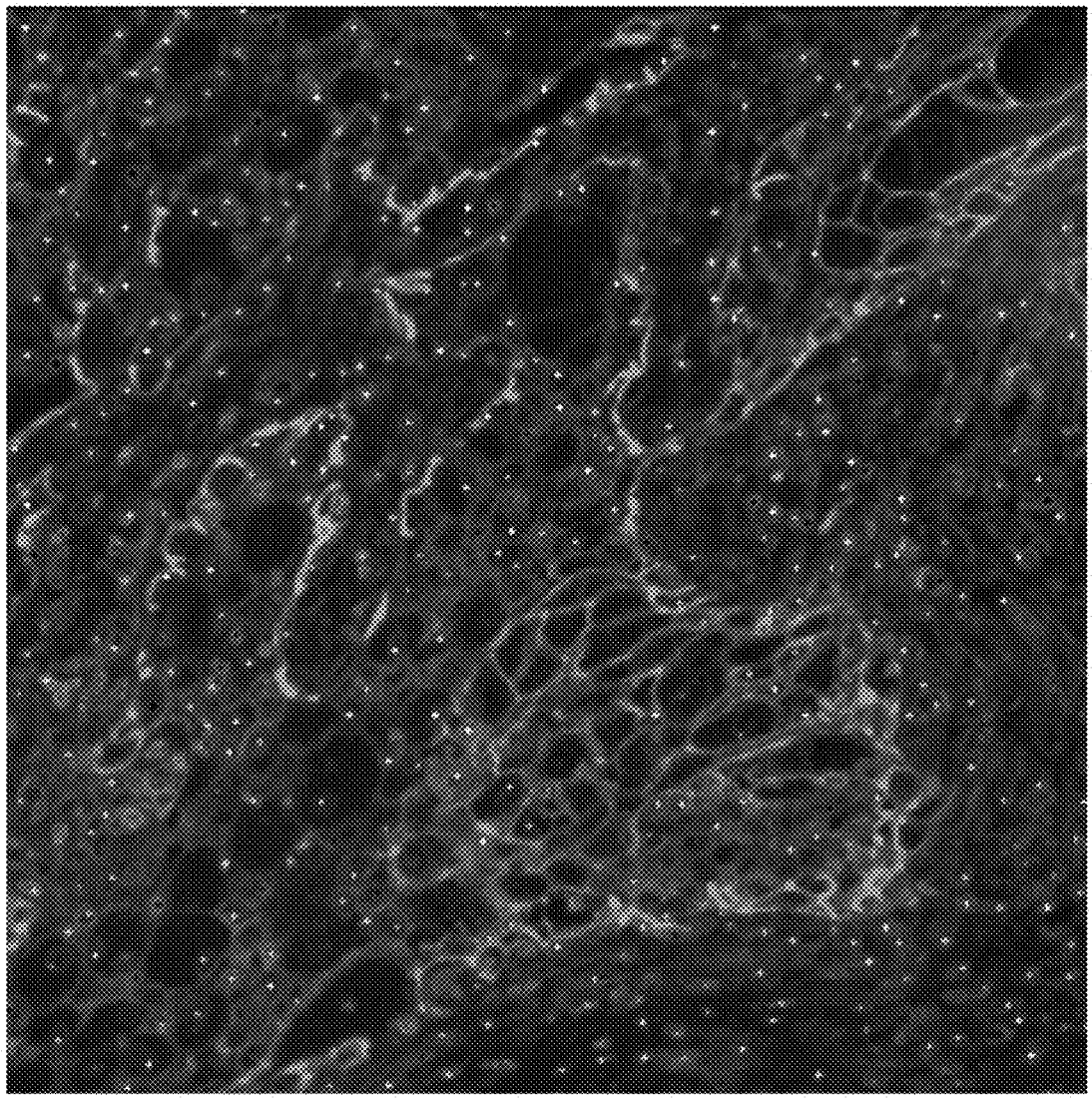
FIG. 6 illustrates the result of nuclear seeding overlaid with the nuclear and membrane stain channels, in accordance with some embodiments.

The image of the nuclear-stained sample was processed using nuclear-seed localization performed in accordance with the method depicted in FIG. 3. The processing produced a nuclear-seed image. FIG. 6 illustrates the result of nuclear seeding overlaid with the nuclear and membrane stain channels. The plus signs represent the seed locations for nuclei, which are the output of nuclear seed localization.

Figure 7:
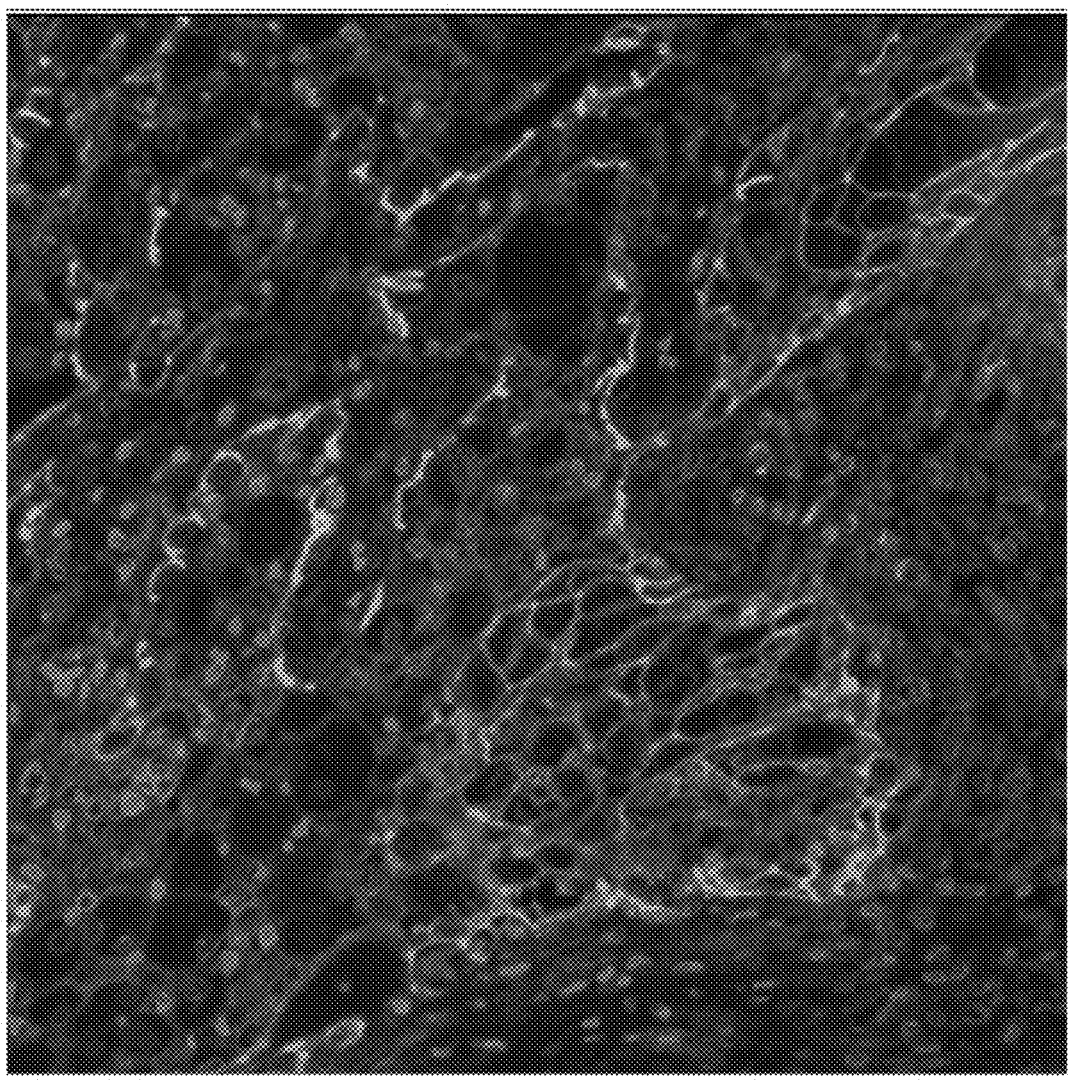
FIG. 7 illustrates an immunofluorescent image of fluorescent-stained cell nuclei and membranes, in accordance with some embodiments.

FIG. 7 is a superposition of tissue section stained with nuclear stain and detected membranes. The membrane stain is shown in violet (magma) and the nuclear stain is shown in green (viridis) color. Dark areas, typically within a membrane contour and surrounding a nucleus, belong to non-nucleus regions of a cell, such as cytoplasm.

Figure 8:
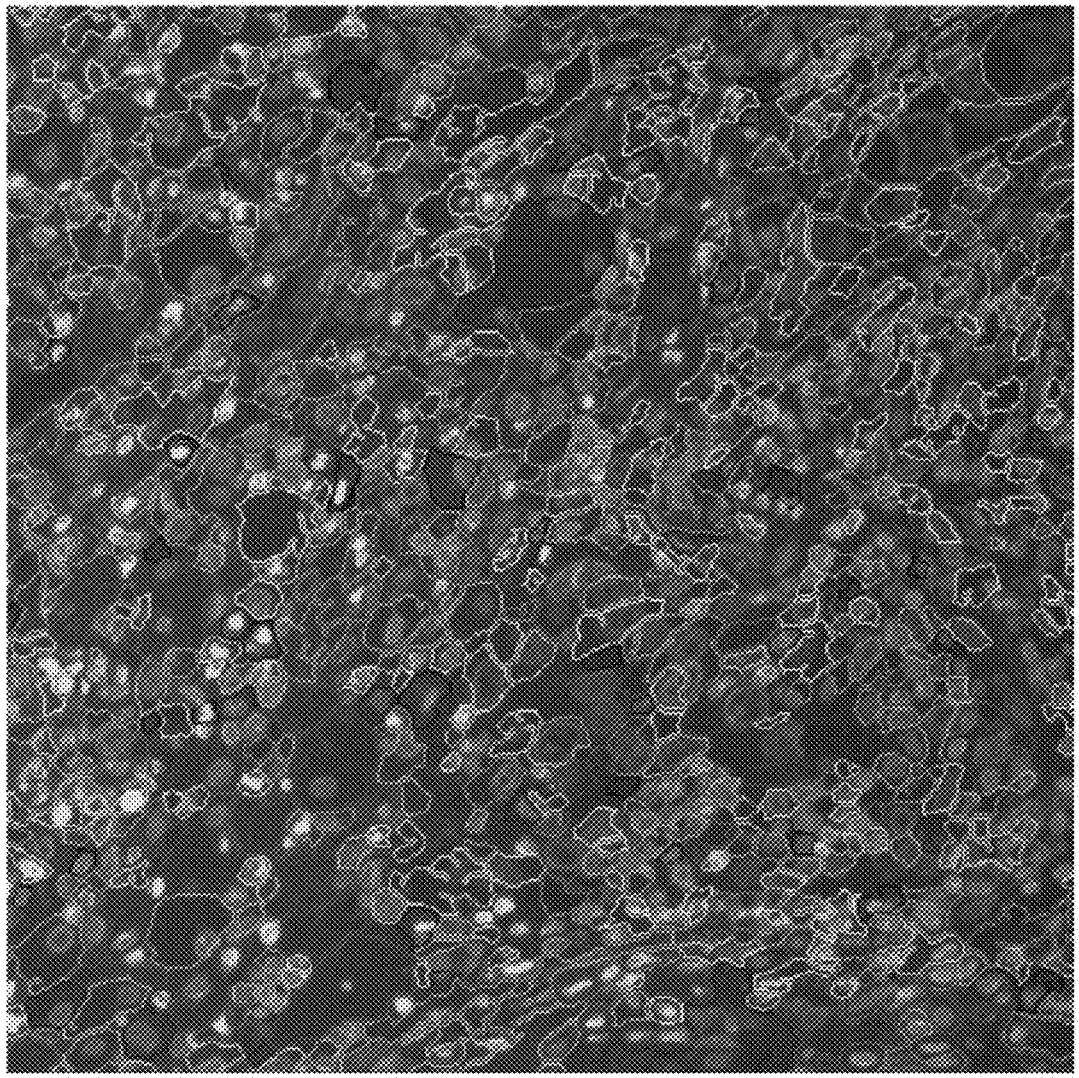
FIG. 8 illustrates the result of cell segmentation overlaid with the nuclear stain channel, in accordance with some embodiments.

Whole-area cell segmentation using the membrane segmentation and nuclear seed detection results was performed in accordance with the method depicted in FIG. 4. This segmentation generated a labeled pixel-by-pixel segmentation map of individual cells. The nuclear seeds may be used to correct under-segmented labels from membrane segmentation. FIG. 8 illustrates the results of the cell segmentation overlaid with the nuclear stain channel, which included a labeled pixel-by-pixel segmentation map of individual cells. Nuclear seeds were used to correct under-segmented labels from membrane segmentation using the approach described herein with respect to the method depicted in FIG. 4.

The embodiments described herein may provide a number of advantages. For example, a full-cell segmentation map may be generated extending to cell boundaries. This may improve the accuracy of image-based analysis of immunofluorescent-stained tissue samples. Other advantages include identification of features not otherwise observed with pure nuclear staining, e.g., mitotic figures, and improved cell segmentation in cases with diffused or poor nuclear staining, e.g., tumor cells.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

It is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure.

While the principles of the disclosure have been described above in connection with specific apparatuses and methods, it is to be clearly understood that this description is made only by way of example and not as limitation on the scope of the disclosure.

What is claimed is:

1. A method comprising:
    staining a plurality of cells with a membrane stain to generate a membrane-stained sample;
    generating a first fluorescence image of at least a portion of the membrane-stained sample;
    converting the first fluorescence image into binary, thereby generating a binary image;
    detecting cell boundaries of the plurality of cells in the binary image and generating one or more membrane labels based on the cell boundaries, thereby generating a membrane-segmented label image;
    staining the plurality of cells with a nuclear stain to generate a nuclear-stained sample;
    generating a second fluorescence image of at least a portion of the nuclear-stained sample;
    performing nuclear seed detection on the second fluorescence image by locating nuclei of the plurality of cells using the nuclear stain and generating one or more nuclear labels based on the nuclear seed detection;
    segmenting the plurality of cells in at least one of the first fluorescence image or the second fluorescence image based on the membrane labels and the nuclear labels;
    responsive to identifying one or more incorrect membrane labels, correcting the membrane labels;
    obtaining one or more undersegmented membrane labels and determining one or more additional membrane labels using the undersegmented labels and detected peaks in the second fluorescence image;
    merging the corrected membrane labels and the one or more additional membrane labels;
    labeling, using the merged membrane labels, the plurality of cells in at least one of the first fluorescence image or the second fluorescence image to generate a labeled fluorescence image; and
    displaying the labeled fluorescence image.

2. The method of claim 1, wherein the membrane stain exhibits a different color than the nuclear stain.

3. The method of claim 1, wherein the plurality of cells are comprised in a tissue sample.

4. The method of claim 1, wherein detecting the cell boundaries further comprises performing hysteresis thresholding and skeletonization.

5. The method of claim 1, wherein detecting the cell boundaries further comprises performing connected component labeling.

6. The method of claim 1, wherein performing nuclear seed detection further comprises computing a Laplacian of the nuclear stain in the second fluorescence image, wherein peaks of the Laplacian indicate nuclear seeds.

7. The method of claim 1, wherein performing nuclear seed detection further comprises detecting nuclear seeds by applying a trained machine-learning technique.

8. The method of claim 1, wherein labeling the plurality of cells further comprises performing masked watershed segmentation.

9. A computer-program product tangibly embodied in a non-transitory machine-readable storage medium, including instructions configured to cause one or more data processors to:

assert access a first fluorescence image of at a least a portion of membrane-stained sample, wherein the membrane-stained sample includes a biological sample that comprises a plurality of cells and that is stained with a membrane stain;

convert the first fluorescence image into binary, thereby generating a binary image;

detect cell boundaries of the plurality of cells in the binary image and generate one or more membrane labels based on the cell boundaries, thereby generating a membrane-segmented label image;

access a second fluorescence image of at a least a portion of nuclear-stained sample, wherein the nuclear-stained sample includes a biological sample that comprises a plurality of cells and that is stained with a nuclear stain;

perform nuclear seed detection on the second fluorescence image by locating nuclei of the plurality of cells using the nuclear stain and generate one or more nuclear labels based on the nuclear seed detection;

segment the plurality of cells in at least one of the first fluorescence image or the second fluorescence image based on the membrane labels and the nuclear labels;

responsive to an identification of one or more incorrect membrane labels, correct the membrane labels;

obtain one or more undersegmented membrane labels and determine one or more additional membrane labels using the undersegmented labels and detected peaks in the second fluorescence image;

merge the corrected membrane labels and the one or more additional membrane labels;

label, using the merged membrane labels, the plurality of cells in at least one of the first fluorescence image or the second fluorescence image to generate a labeled fluorescence image; and display the labeled fluorescence image.

10. The computer-program product of claim 9, wherein the membrane stain exhibits a different color than the nuclear stain.

11. The computer-program product of claim 9, wherein the plurality of cells are comprised in a tissue sample.

12. The computer-program product of claim 9, further including instructions configured to cause one or more data processors to perform hysteresis thresholding and skeletonization.

13. The computer-program product of claim 9, further including instructions configured to cause one or more data processors to perform connected component labeling.

14. The computer-program product of claim 9, further including instructions configured to cause one or more data processors to compute a Laplacian of the nuclear stain in the second fluorescence image, wherein peaks of the Laplacian indicate nuclear seeds.

15. The computer-program product of claim 9, further including instructions configured to cause one or more data processors to detect nuclear seeds by applying a trained machine-learning technique.

16. The computer-program product of claim 9, further including instructions configured to cause one or more data processors to perform masked watershed segmentation.

17. A system comprising:
one or more data processors; and
a non-transitory computer readable storage medium containing instructions which, when executed on the one or more data processors, cause the one or more data processors to:

access a first fluorescence image of at a least a portion of membrane-stained sample, wherein the membrane-stained sample includes a biological sample that comprises a plurality of cells and that is stained with a membrane stain;

convert the first fluorescence image into binary, thereby generating a binary image;

detect cell boundaries of the plurality of cells in the binary image and generate one or more membrane labels based on the cell boundaries, thereby generating a membrane-segmented label image;

access a second fluorescence image of at a least a portion of nuclear-stained sample, wherein the nuclear-stained sample includes a biological sample that comprises a plurality of cells and that is stained with a nuclear stain;

perform nuclear seed detection on the second fluorescence image by locating nuclei of the plurality of cells using the nuclear stain and generate one or more nuclear labels based on the nuclear seed detection;

segment the plurality of cells in at least one of the first fluorescence image or the second fluorescence image based on the membrane labels and the nuclear labels;

responsive to an identification of one or more incorrect membrane labels, correct the membrane labels;

obtain one or more undersegmented membrane labels and determine one or more additional membrane labels using the undersegmented labels and detected peaks in the second fluorescence image;

merge the corrected membrane labels and the one or more additional membrane labels;

label, using the merged membrane labels, the plurality of cells in at least one of the first fluorescence image or the second fluorescence image to generate a labeled fluorescence image; and display the labeled fluorescence image.

18. The system of claim 17, wherein the membrane stain exhibits a different color than the nuclear stain.

19. The system of claim 17, wherein the plurality of cells are comprised in a tissue sample.

20. The system of claim 17, wherein the non-transitory computer readable storage medium further contains instructions which, when executed on the one or more data processors, cause the one or more data processors to perform connected component labeling.

21. The system of claim 17, wherein the non-transitory computer readable storage medium further contains instructions which, when executed on the one or more data processors, cause the one or more data processors to compute a Laplacian of the nuclear stain in the second fluorescence image, wherein peaks of the Laplacian indicate nuclear seeds.

* * * * *